Figure 14:
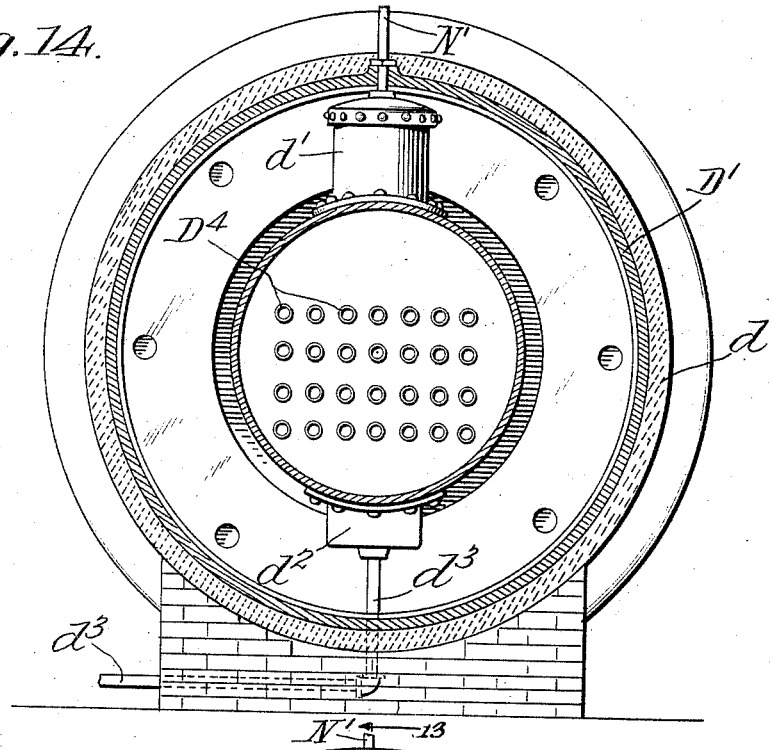

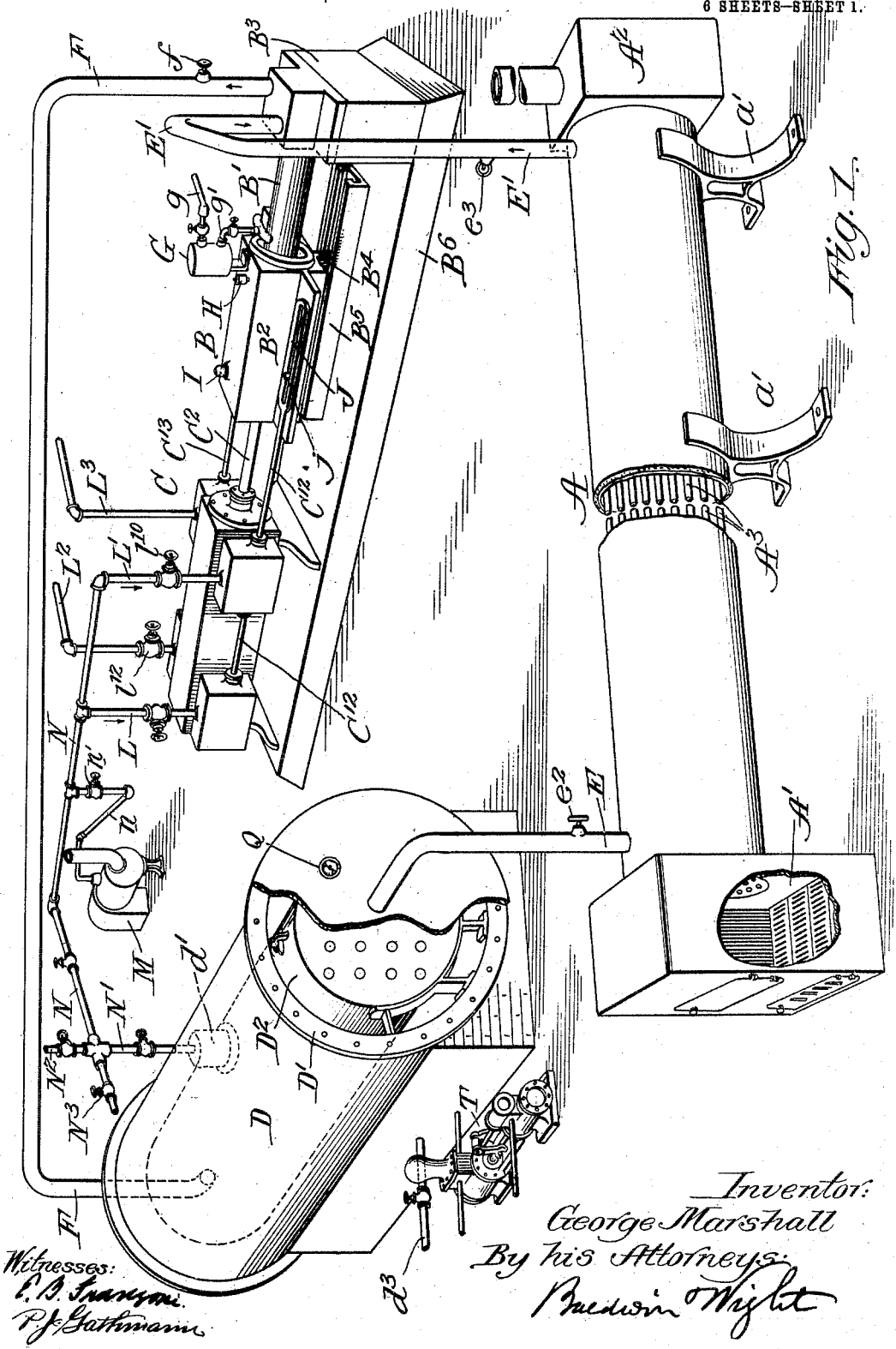

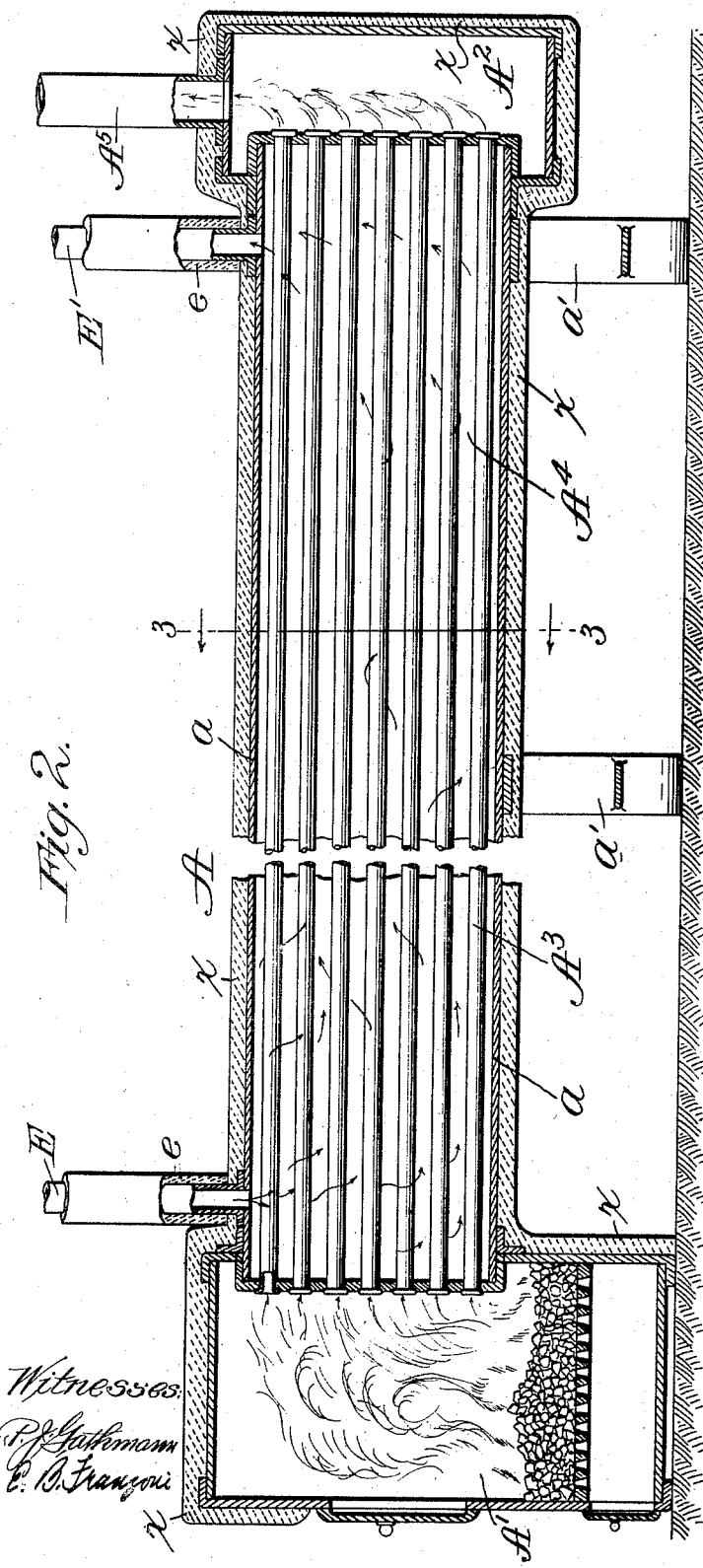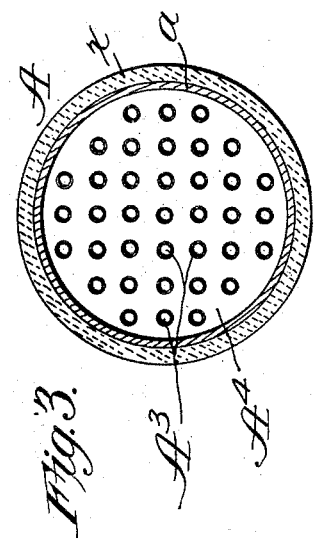

G. MARSHALL.
APPARATUS FOR GENERATING STEAM.
APPLICATION FILED MAY 10, 1913.
1,078,545.
Patented Nov. 11, 1913.
6 SHEETS—SHEET 3.
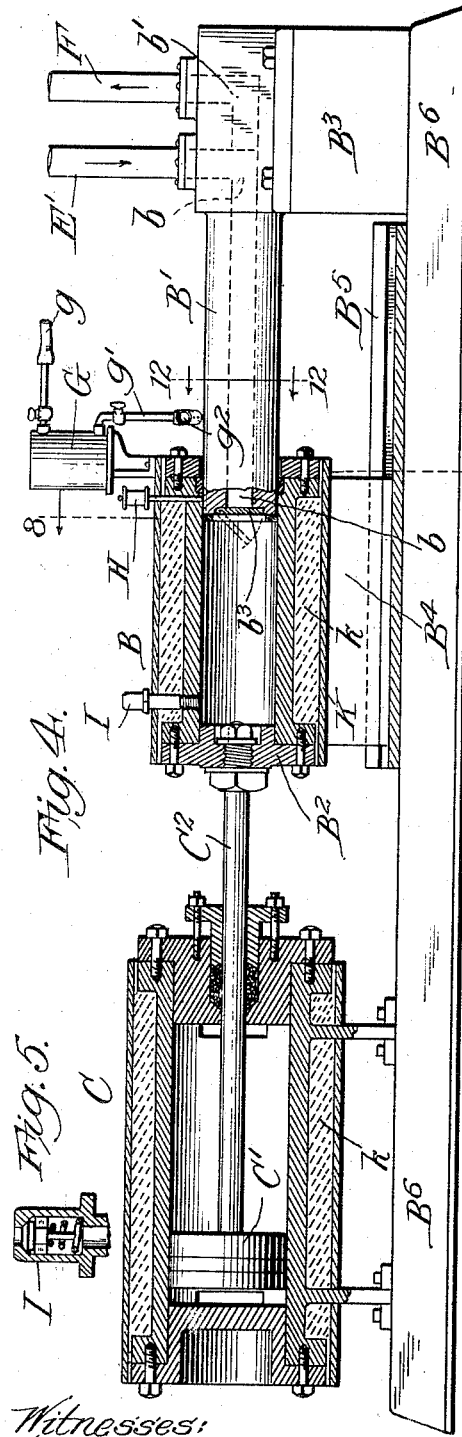
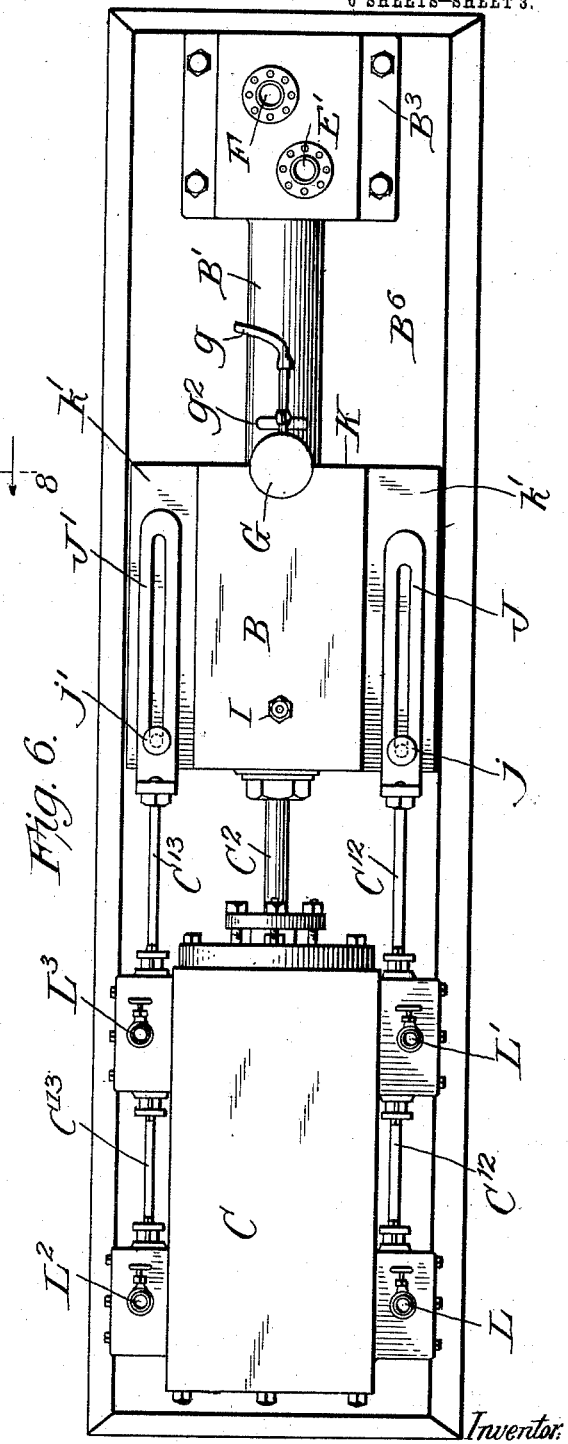
Witnesses:
P. J. Gathmann
C. B. Franzoni
Inventor:
George Marshall
By his Attorneys
Baldwin Wight G. MARSHALL.
APPARATUS FOR GENERATING STEAM.
APPLICATION FILED MAY 10, 1913.
1,078,545. Patented Nov. 11, 1913.
6 SHEETS—SHEET 4.
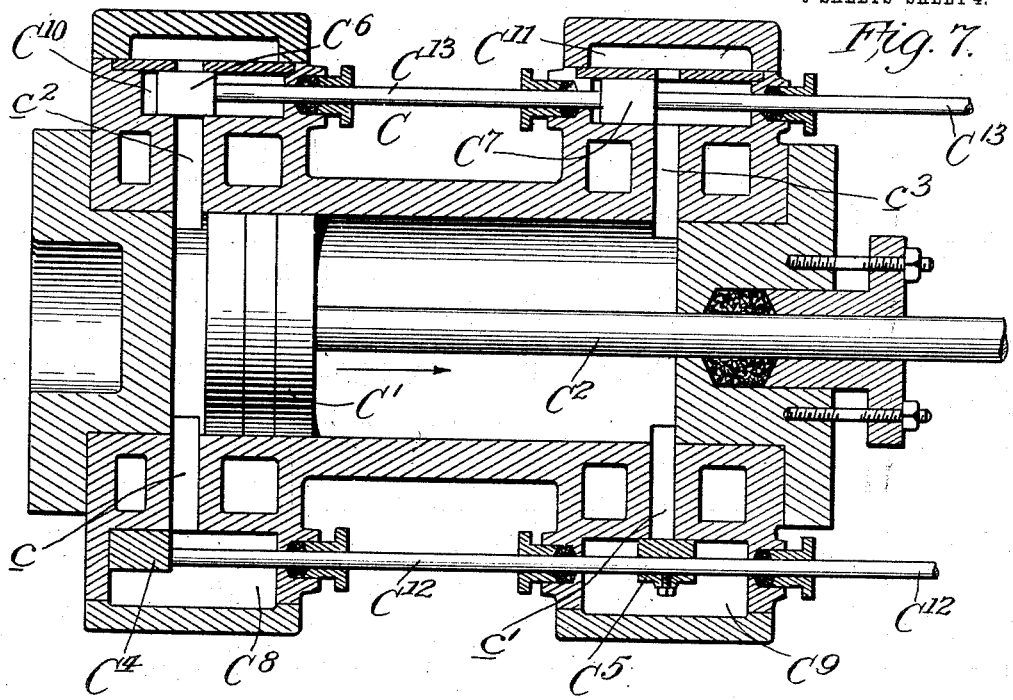
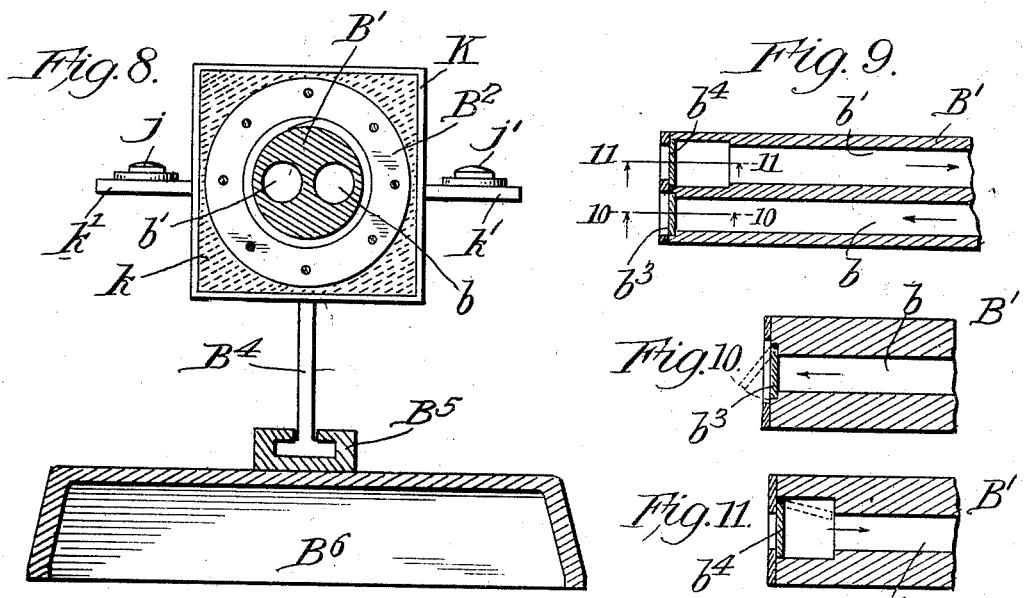
Witnesses:
Inventor:
George Marshall,
By his Attorneys,
Baldwin Wight
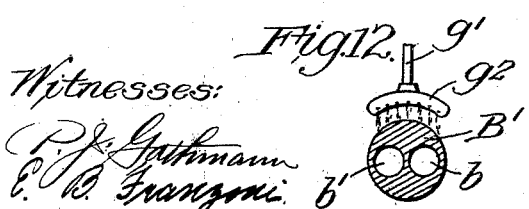

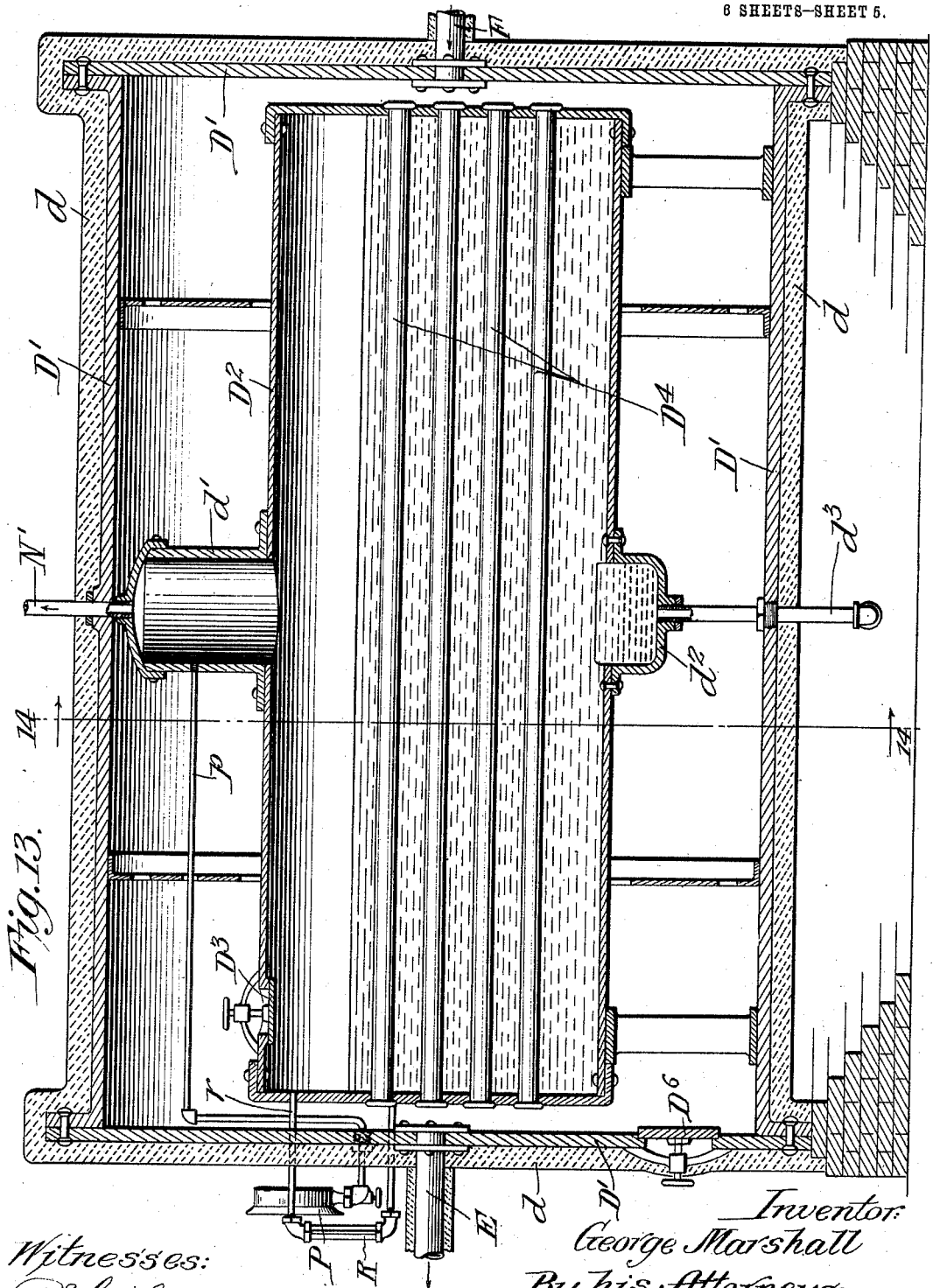

G. MARSHALL.
APPARATUS FOR GENERATING STEAM.
APPLICATION FILED MAY 10, 1913.

1,078,545.

Patented Nov. 11, 1913.

6 SHEETS—SHEET 6.

Witnesses:

Inventor:
George Marshall
By his Attorneys:

UNITED STATES PATENT OFFICE.

GEORGE MARSHALL, OF FREMONT, NEBRASKA.

APPARATUS FOR GENERATING STEAM.

1,078,545.  Specification of Letters Patent.  Patented Nov. 11, 1913.

Application filed May 10, 1913. Serial No. 766,840.

*To all whom it may concern:*

Be it known that I, GEORGE MARSHALL, a citizen of the United States, residing in Fremont, in the county of Dodge and State of Nebraska, have invented certain new and useful Improvements in Apparatus for Generating Steam, of which the following is a specification.

The object of this invention is to provide means for generating steam, using as a heating agent air at a high temperature and under compression.

Where a steam boiler is heated by a fire beneath it, the lower portion or bottom of the boiler is heated to a much greater extent than the upper portion thereof and this is true even when fire tubes lead the products of combustion through the boiler. Furthermore, in the usual practice the fire is necessarily located adjacent the boiler which is sometimes undesirable. I have provided means whereby the furnace may be located at some point remote from the boiler and whereby the heat may be distributed uniformly around and through the boiler so as to obtain the greatest efficiency, and I do this by first compressing air, then heating it to a high temperature, then recompressing it to increase the heat and pressure, and then supplying this hot compressed air to a shell surrounding the boiler at a sufficiently high temperature to generate steam. The air is conveyed from the shell, reheated and recompressed and this operation is continued indefinitely.

More specifically my invention consists in providing a furnace in which compressed air is heated, a compressor in which this hot compressed air is recompressed to increase its temperature and to cause it to circulate, a steam boiler, and a shell surrounding the boiler especially adapted to receive and discharge the hot, compressed air as it circulates. Any suitable means may be employed for heating the air. In some cases electric heaters may be used, but preferably I employ a furnace having at one end a fire chamber and at the other end a smoke box and discharge pipe for the products of combustion and which is connected with the fire box by tubes, which tubes extend through a chamber to which air is admitted and from which it is discharged. The hot air thus produced is conveyed to an air compressor, driven by a steam engine and this compressor is so constructed that air is drawn into it from the heater, is compressed and then transmitted to a steam boiler surrounded by an insulated casing or shell and having tubes which convey compressed air through the boiler while said boiler is at the same time surrounded by the hot compressed air from the compressor. The hot compressed air leaves the boiler and is conveyed back to the heater, where its temperature is raised and from which it again passes to the compressor and to the boiler in the manner first described. Suitable means are provided for feeding water to the boiler, and the compressor and the engine which drives it are suitably constructed and arranged to perform their functions.

In starting the apparatus I employ a small portable boiler sufficient to drive the steam engine which operates the compressor. By means of this portable boiler the engine which drives the compressor may be operated to fill the system with compressed air and after the apparatus is thus started, this portable boiler may be disconnected and the apparatus will operate as long as fire is kept up in the furnace.

Other features of my invention and the details of construction will be hereinafter more fully described.

Figure 15:
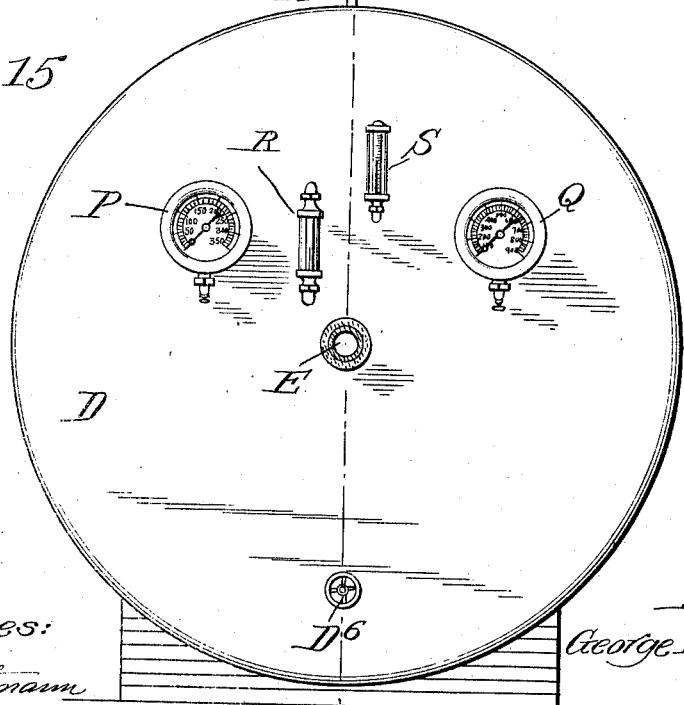

In the accompanying drawings:—Figure 1 is a perspective view of the heater, the compressor, its engine and the boiler constructed and connected in accordance with my invention. Other minor features of the apparatus are also illustrated. Fig. 2 shows a vertical central section through a heater which is preferably employed. Fig. 3 shows a vertical section on the line 3—3 of Fig. 2. Fig. 4 is a view partly in side elevation and partly in vertical central section of the air compressor and its engine. Fig. 5 is a detail view in section of a valve which may be used on the compressor. Fig. 6 is a plan view of the compressor and its driving engine. Fig. 7 is a view on an enlarged scale and in horizontal section of the engine which drives the compressor. Fig. 8 shows a vertical section on the line 8—8 of Fig. 4. Fig. 9 is a detail view in section of the piston forming part of the compressor. Fig. 10 shows a section on the line 10—10 of Fig. 9. Fig. 11 shows a section on the line 11—11 of Fig. 9. Fig. 12 shows a section on the line 12—12 of Fig. 4, illustrating particularly the device for cooling the piston of the compressor. Fig. 13 shows a longitudinal central section through the boiler or steam generator and its shell. Fig. 14 shows a vertical section thereof on the line 14—14 of Fig. 13. Fig. 15 shows an end elevation of the shell.

In Fig. 1 I have shown diagrammatically the apparatus employed and the manner in which the different parts thereof are connected. A indicates the heater, B the compressor, C the engine which drives the compressor, and D the shell of the boiler or steam generator. The heater A may be of any suitable construction. In some cases an electric heater may be used, but in operating on a large scale I preferably employ a heater of the kind shown, which comprises a fire box $A'$ at one end of the furnace, and a smoke box $A^2$ at the opposite end thereof, the fire box and smoke box being connected by fire tubes $A^3$, which extend through an air chamber $A^4$. The casing $a$ for the air chamber is closed at opposite ends as shown and it is supported by standards $a'$ of any suitable construction. The several casings are suitably insulated, as indicated at $x$, to retain heat. The smoke box communicates with a smoke pipe $A^5$ while the fire box is equipped with a suitable grate, doors, etc. E indicates a pipe for admitting air to the air chamber $A^4$, and $E'$ indicates a pipe for conveying air from the air chamber $A^4$ to the compressor. These pipes are suitably insulated, as indicated at $e$ and the pipe E is provided with a valve $e^2$ while the pipe $E'$ is provided with a similar valve $e^3$. Said pipe $E'$ leads to the air compressor B which comprises a stationary piston $B'$ and a reciprocating cylinder $B^2$. The piston $B'$ is formed with two passages $b$, $b'$ one of which, $b$, communicates with the air entrance pipe $E'$ while the other, $b'$, communicates with an exit pipe F which leads to the boiler shell D. The passage $b$ is provided with a valve $b^3$ opening into the cylinder of the compressor and the passage $b'$ is provided with a valve $b^4$ opening outward to permit compressed air to enter the pipe F. The pipe F is provided with a valve $f$ and should be insulated in the same manner that the pipes E, $E'$ are insulated. The piston $B'$ is supported on a suitable standard $B^3$, and as before stated, is stationary. The cylinder $B^2$ is mounted on a standard $B^4$ which is supported and guided by a grooved plate $B^5$ mounted on the bed plate $B^6$, the arrangement being such that the cylinder will be sustained and held in proper alinement with the piston while being supported and guided by the grooved plate $B^5$.

As considerable heat is produced and developed in the compressor I provide means for cooling the piston $B'$. For this purpose I preferably employ a receptacle G, to which water is supplied through a pipe connection $g$ and from which it passes by pipe $g'$ through a spraying device $g^2$ shown in detail in Fig. 12. The piston may be oiled by a lubricator H of suitable construction. I indicates a valve (shown in detail in Fig. 5) which under certain conditions allows air to enter the compressor from the atmosphere. It is through this valve that air is admitted to start the system.

The cylinder $B^2$ may be reciprocaed in any suitable way, but preferably by means of a steam engine C constructed in the way illustrated in the drawings. As shown, the piston $C'$ of this engine is connected by its rod $C^2$ with the end of the cylinder $B^2$, and of course as the piston reciprocates the cylinder of the compressor is correspondingly reciprocated.

As shown more particularly in Fig. 7 the engine cylinder is provided with admission ports $c$, $c'$ and exhaust ports $c^2$, $c^3$. The admission ports are controlled by slide valves $C^4$, $C^5$ while the exhaust ports are controlled by slide valves $C^6$, $C^7$. These valves operate in suitable valve chambers $C^8$, $C^9$, $C^{10}$, $C^{11}$, the valves $C^4$, $C^5$ being connected with a valve-operating rod $C^{12}$ and the valves $C^6$, $C^7$ being connected with an operating rod $C^{13}$. The rod $C^{12}$ is coupled with a slotted plate J coöperating with a pin $j$ secured to the casing K of the compressor cylinder $B^2$. It will be understood that the compressor cylinder is surrounded by insulating material $k$ inclosed in the casing K, and this casing is provided with laterally projecting flanges $k'$ carrying pins $j$, $j'$. The slotted plate J coöperates with the pin $j$, as before stated, while a slotted plate $J'$ coöperating with the pin $j'$, is coupled with the valve rod $C^{13}$. As the engine operates and reciprocates the cylinder of the compressor proper movements are given to the several valves to regulate and control the admission and exhaust. L, $L'$ indicate valved pipes for supplying steam to the engine through the admission valves and $L^2$, $L^3$ indicate exhaust pipes.

M indicates a small portable boiler which is connected by means of the pipes N and $n$ with the pipes L, $L'$ for supplying steam to the engine when the apparatus is first started. The pipe N communicates with a branch pipe $N'$ leading to the steam space of the boiler or generator $D^2$ and also communicates with branch pipes $N^2$, $N^3$ through which steam may be conveyed to any desired points. The pipe F, before referred to, conveys the hot compressed air to the shell D. This pipe should be properly insulated to prevent the loss of heat. It enters the shell at one end and the hot compressed air delivered to the shell passes through it and is conveyed by means of the pipe E back to the heater A where its temperature is raised and from which it is again conveyed to the compressor, where the heat is increased by reason of the compression and from which it again passes to the shell of the boiler or generator, the preferred details of construction of which are shown most clearly in Figs. 13, 14 and 15. As there shown the generator comprises a metal casing D', which is inclosed by insulating material $d$. Within this casing there is a boiler $D^2$ provided with a steam dome $d'$ and a sediment receptacle $d^2$. The sediment receptacle communicates with a draw-off pipe $d^3$ while the steam dome communicates with the pipe N', before referred to.

$D^3$ indicates a man-hole, provided with suitable closing devices, and $D^4$ indicate tubes which pass through the boiler and are connected with the heads or ends thereof, in the manner shown.

P indicates a steam gage, Q an air pressure gage, S a thermometer and R a water gage.

$D^6$ indicates a man-hole closed in any suitable way.

Water may be supplied to the boiler by any suitable apparatus, as by means of an injector or a water supply pump T, of any suitable construction. The water gage R is connected, as indicated by $r$ (Fig. 13) with the water space and steam space of the boiler and the pressure gage P is connected with the steam dome $d'$ by a pipe connection $p$. By this apparatus the hot compressed air which is supplied to the generator is made to act uniformly around and through the water chamber and thus the water is more quickly and more thoroughly heated and steam is more easily produced. Furthermore, the boiler may be remote from the furnace so that it is not subjected directly to the products of combustion and is hence less liable to injury and requires less frequent repair.

The engine C for driving the compressor may be operated as either a single acting or a double acting engine, and in starting the apparatus fresh or cold air is pumped into the system through the valve I and made to surround the boiler. At this time the valve $e^3$ is closed and the engine C is operated as a double acting engine, steam being admitted properly at opposite ends of the cylinder and properly exhausted. This operation is continued until the air in the space surrounding the boiler and the air in the heater reaches as high a pressure as can be obtained. Then the furnace A is brought into operation and the valve $e^3$ is opened so that the air is free to circulate throughout the entire system. The valve $l^{10}$ in the pipe L' may be closed and the valve $l^{12}$ in the pipe $L^2$ is partly closed and the engine C operated as a single acting engine, the pressure of air in the compressor being sufficient to return the piston C' to the outer end of its cylinder. The exhaust pipe $L^2$ is suitably throttled to prevent air pressure from jamming the piston back. The compressing, recompressing, heating and reheating is continued until the steam is generated in the boiler $D^2$; then the small boiler M may be cut off by means of the valve $n'$ and steam may be taken from the boiler $D^2$ to operate the engine C and steam may also be taken through the pipes $N^2$, $N^3$ to supply other engines or other apparatus. After the apparatus is once started and steam is produced in the boiler the operation may be continued indefinitely but of course it involves the consumption of fuel or the consumption of energy of some kind to heat the air supplied to the compressor.

Referring again to the engine C, as before stated it may be operated as a single acting engine, in which case the valves $C^4$ and $C^6$ are employed and the valves $C^5$ and $C^6$ may be disregarded. Fig. 7 of the drawings shows the admission valve $C^4$ open and the exhaust valve $C^6$ closed. The piston will be driven to the opposite end of the cylinder by the steam admitted at $c$ and the piston travels to nearly its full length before the valves are moved. When the piston has arrived at nearly the end of its stroke the pin $j$ first engages the slotted plate J and the admission valve $C^4$ is closed; then the pin $j'$ engages the slotted plate J' and the exhaust valve $C^6$ is opened. On the return stroke the piston travels to near the limit of its movement to the left as viewed in the drawings and the pin $j'$ engages the slotted plate J' and closes the exhaust valve $C^6$ and then the pin $j$ engages the slotted plate J and opens the admission valve $C^4$ and the operation continues as before. At this time it will be understood that the valve $l^{10}$ is closed and the valve $l^{12}$ is throttled. It will be understood that the engine is first operated as a double acting engine to fill the system with air which is put under compression. Afterward it is operated as a single acting engine, in the manner just described. It will also be understood that the piston is driven in one direction by steam admitted to it through the port $c$ and the piston is returned by compressing air in the compressor B. At this time the exhaust pipe $L^2$ is throttled in order that the piston may not be returned too suddenly or jammed against the end of the cylinder by the movement given to it by the compressed air. When the engine is operating as a double acting engine the admission pipes L, L' and the exhaust pipes $L^2$, $L^3$ are all open but are controlled by the valves $C^4$, $C^5$, $C^6$, $C^7$. In this case, as shown in Fig. 7, the admission valve $C^4$ is open while the admission valve $C^5$ is closed when the piston is in the position shown and at this time also the exhaust valve $C^6$ is closed and the exhaust valve $C^7$ is open. Just before the piston has reached the limit of its stroke to the right the pin $j$ engages the slotted plate J and the admission port $c$ is first closed and this closure is completed before the admission valve $C^5$ is open. At the same time the pin $j'$ engages the slotted plate J′ and the exhaust valve $C^6$ is opened and the exhaust valve $C^7$ closed. On the return stroke the four valves are operated in a similar way. I prefer to employ this kind of an engine, but obviously engines of other types may be used for operating the compressor and it is also obvious that other kinds of compressors may be used, but that shown is preferred.

The details of construction of other parts of the apparatus may be varied without departing from the main features of my invention. But I would say further that the tubes $A^3$ of the heater and the pipes that connect the heater with the shell of the boiler are of cast iron.

The drawings show only one boiler with its shell but it is obvious that several boilers with suitable shells could be placed side by side and connected with the heating and circulating system.

It will be understood that the apparatus is so operated as to keep the whole system filled with air under high pressure and this compressed air is reheated and recompressed continually during the process.

I claim as my invention:—

1. An apparatus for generating steam, comprising a heater, a compressor to which the heated air is conveyed, means for operating said compressor, a boiler, means for conveying the hot compressed air from the compressor to the boiler, and means connecting said boiler with the heater for conveying air from the boiler to the heater.

2. An apparatus for generating steam, comprising a heater to which air is admitted, a compressor receiving hot air from the heater, means for driving the compressor, a boiler, its shell, a connection between the compressor and the shell for supplying hot compressed air thereto, and a connection between the shell and the heater for conveying air from the shell to the heater.

3. An apparatus for generating steam, comprising a heater, a compressor to which the heated air is conveyed, a steam engine for operating the compressor, a steam boiler for starting and operating the steam engine until the apparatus is supplied with compressed air, means for connecting the starting boiler with the engine and for disconnecting it therefrom, a boiler, its shell, means for conveying the hot compressed air from the compressor to the boiler shell, and means connecting said shell with the heater for conveying air from the shell to the heater.

In testimony whereof, I have hereunto subscribed my name.

GEORGE MARSHALL.

Witnesses:
S. S. SIDNER,
EARL J. LEE.

Copies of this patent may be obtained for five cents each, by addressing the "Commissioner of Patents, Washington, D. C."